United States Patent [19]

Iwamoto et al.

[11] Patent Number: 4,890,590
[45] Date of Patent: Jan. 2, 1990

[54] FAIL-SAFE METHOD AND APPARATUS FOR INTERNAL COMBUSTION ENGINES

[75] Inventors: Shinichi Iwamoto; Shigenori Isomura; Mitsunori Takao; Kenichiro Kamai, all of Kariya, Japan

[73] Assignee: Nippondenso Co., Ltd., Kariya, Japan

[21] Appl. No.: 271,597

[22] Filed: Nov. 15, 1988

[30] Foreign Application Priority Data

Nov. 16, 1987 [JP] Japan .................................. 62-288748

[51] Int. Cl.⁴ .............................................. F02B 77/00
[52] U.S. Cl. ................................. 123/198 D; 123/478; 123/480; 123/512
[58] Field of Search .... 123/198 D, 198 DB, 198 DC, 123/478, 479, 480, 487, 512; 340/53

[56] References Cited

U.S. PATENT DOCUMENTS

| | | | |
|---|---|---|---|
| 4,269,156 | 5/1981 | Drellishak | 123/440 |
| 4,562,801 | 1/1986 | Koike | 123/198 D |
| 4,641,618 | 2/1987 | Dogadko et al. | 123/198 DC |
| 4,685,435 | 8/1987 | Denz et al. | 123/198 DB |
| 4,748,955 | 6/1988 | Yonekawa et al. | 123/479 |
| 4,785,785 | 11/1988 | Oba et al. | 123/488 |

FOREIGN PATENT DOCUMENTS

| | | |
|---|---|---|
| 57-49035 | 3/1982 | Japan . |
| 57-52843 | 3/1982 | Japan . |
| 58-176434 | 10/1983 | Japan . |
| 62-103446 | 5/1987 | Japan . |

Primary Examiner—Noah P. Kamen
Attorney, Agent, or Firm—Cushman, Darby & Cushman

[57] ABSTRACT

In an engine control system which determines the amount of fuel to be injected on the basis of an intake pipe pressure detected downstream of a throttle valve and engine speed (D-EFI), fail-safe action is provided when a failure of an intake pipe on the downstream side of the throttle valve is detected. The fail-safe apparatus of the present invention is designed to signal the occurrence of an abnormality with the intake system when the throttle valve is not being opened, that is, the throttle valve is stationary or is closing, a vehicle speed variation exceeds its specific value and the engine speed exceeds its specific value. When these conditions are detected, engine power is controlled lower, thereby assuring vehicle driving safety.

24 Claims, 3 Drawing Sheets

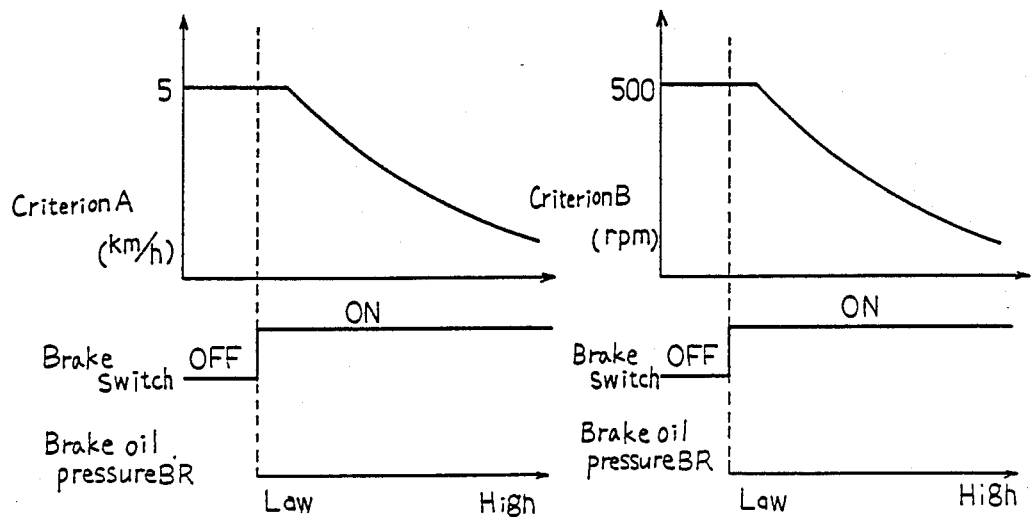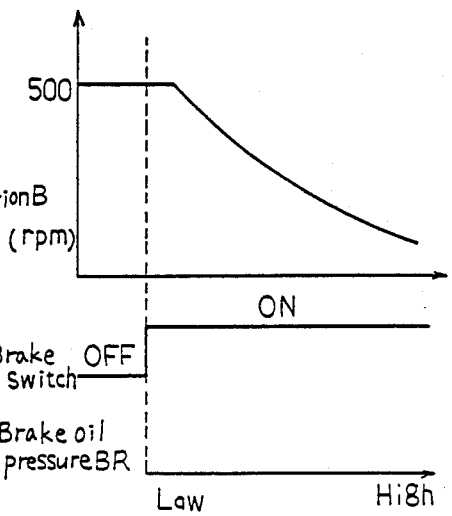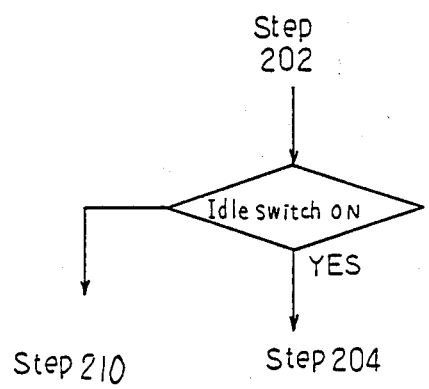

FAIL-SAFE METHOD AND APPARATUS FOR INTERNAL COMBUSTION ENGINES

BACKGROUND OF THE INVENTION

1. Field of the Invention:

The present invention relates to a fail-safe method and apparatus for internal combustion engines for motor vehicles.

2. Description of the Prior Art:

Control devices for fuel injection apparatus for engines of motor vehicles are known in the prior art in which intake air flow and engine speed are detected and, from the detected values of the intake air flow and the engine speed, a basic injection time is determined to control the amount of fuel to be injected from an injection valve (L-EFI). Alternatively, control devices are known in which an intake air pressure on the downstream side of a throttle valve and engine speed are detected and, from the detected values of the intake air pressure and the engine speed, a basic injection time is determined to control the amount of fuel to be injected from an injection valve (D-EFI).

In D-EFI, where the amount of fuel to be injected is controlled on the basis of the intake air pressure and the engine speed, if an intake pipe downstream of the throttle valve is broken or leaks, a large amount of fuel will be injected because the intake air pressure detected increases to atmospheric pressure. Therefore, since air is supplied into the engine through the broken part without being throttled by the throttle valve, the engine speed tends to rise excessively high.

An apparatus for detecting an abnormal value of the measured intake air pressure (indicative of a problem with the intake system) is disclosed in Japanese Patent Provisional Publication (Kokai) No. 57-52643. This document teaches comparing a detected value of intake pressure to throttle valve position and judging an abnormality when the detected pressure exceeds a limit when the throttle valve is closed.

SUMMARY OF THE INVENTION

The present invention solves the above-described problem by providing a fail-safe apparatus and method that can positively restrain abnormal operation of an engine in the event of a failure of piping downstream of the throttle valve when the engine is controlled in accordance with D-EFI.

In the present invention, the fail-safe apparatus and method is controlled on the basis of the intake air pressure and the engine speed. When both a vehicle speed variation and an engine speed variation exceed their respective predetermined criteria while the throttle valve has not been opened further or while the throttle valve is fully closed, the apparatus will judge that the intake system is operating abnormally and force the engine output power to decrease.

BRIEF DESCRIPTION OF THE DRAWINGS

FIGS. 3 and 4 are characteristic drawings showing the setting of criteria A and B used in the flowchart in FIG. 2; and FIG. 5 is part of a flowchart showing another embodiment of the present invention.

DESCRIPTION OF THE PREFERRED EMBODIMENT

Hereinafter, one embodiment of the present invention will be explained with reference to the accompanying drawings.

Figure 1:
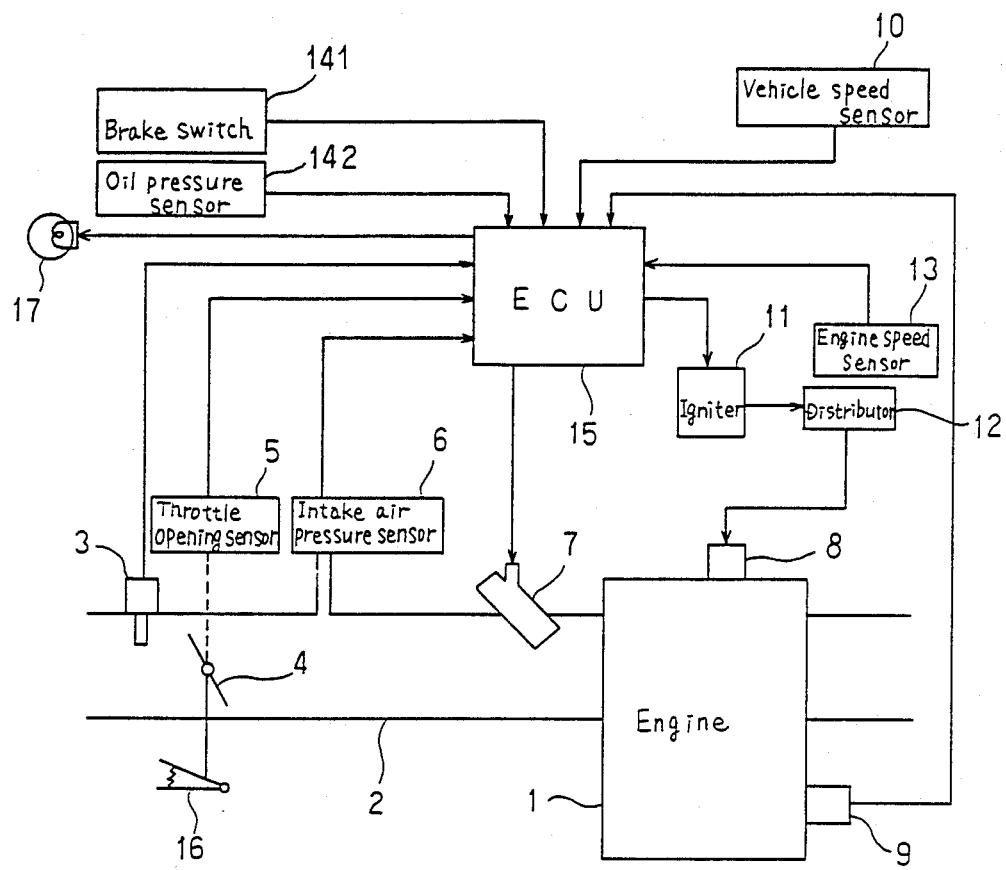
FIG. 1 is a schematic block diagram showing an engine and peripheral equipment to which one embodiment of the present invention is applied.

In FIG. 1, an engine 1 is a four-cylinder spark-ignition type mounted on a vehicle. Arranged in an intake pipe 2, from the upstream side, are an intake air temperature sensor 3 which detects the intake air temperature, a throttle opening sensor 5 which detects the position of a throttle valve 4 coupled to an accelerator pedal 16 operated by a driver, an intake air pressure sensor 6 which detects the intake air pressure on the downstream side of throttle valve 4, and a solenoid-operated injection valve 7 for supplying fuel to engine 1. Engine 1 is provided with an ignition plug 8 and a temperature sensor 9 for detecting engine temperature (cooling water temperature). Furthermore, a vehicle speed sensor 10 is provided to detect the speed of the vehicle in which engine 1 is mounted. The ignition plug 8 is connected to an igniter 11 and a distributor 12, distributor 12 being provided with an engine speed sensor 13 for detecting engine speed. Furthermore, there are provided a brake switch 141 which is actuated by operation of a brake pedal, and an oil pressure sensor 142 for detecting a brake oil pressure. Reference numeral 17 designates an abnormality indicating lamp.

A signal from each of the above-mentioned sensors is applied to ECU 15, which in turn outputs a control signal to injection valve 7 and igniter 11. ECU 15 computes a basic injection time width and a basic ignition timing on the basis of intake air pressure and engine speed, corrects them on the basis of intake air temperature, throttle opening and engine temperature, determines the present injection time width and ignition timing, and then outputs control signals respectively corresponding thereto.

Figure 2:
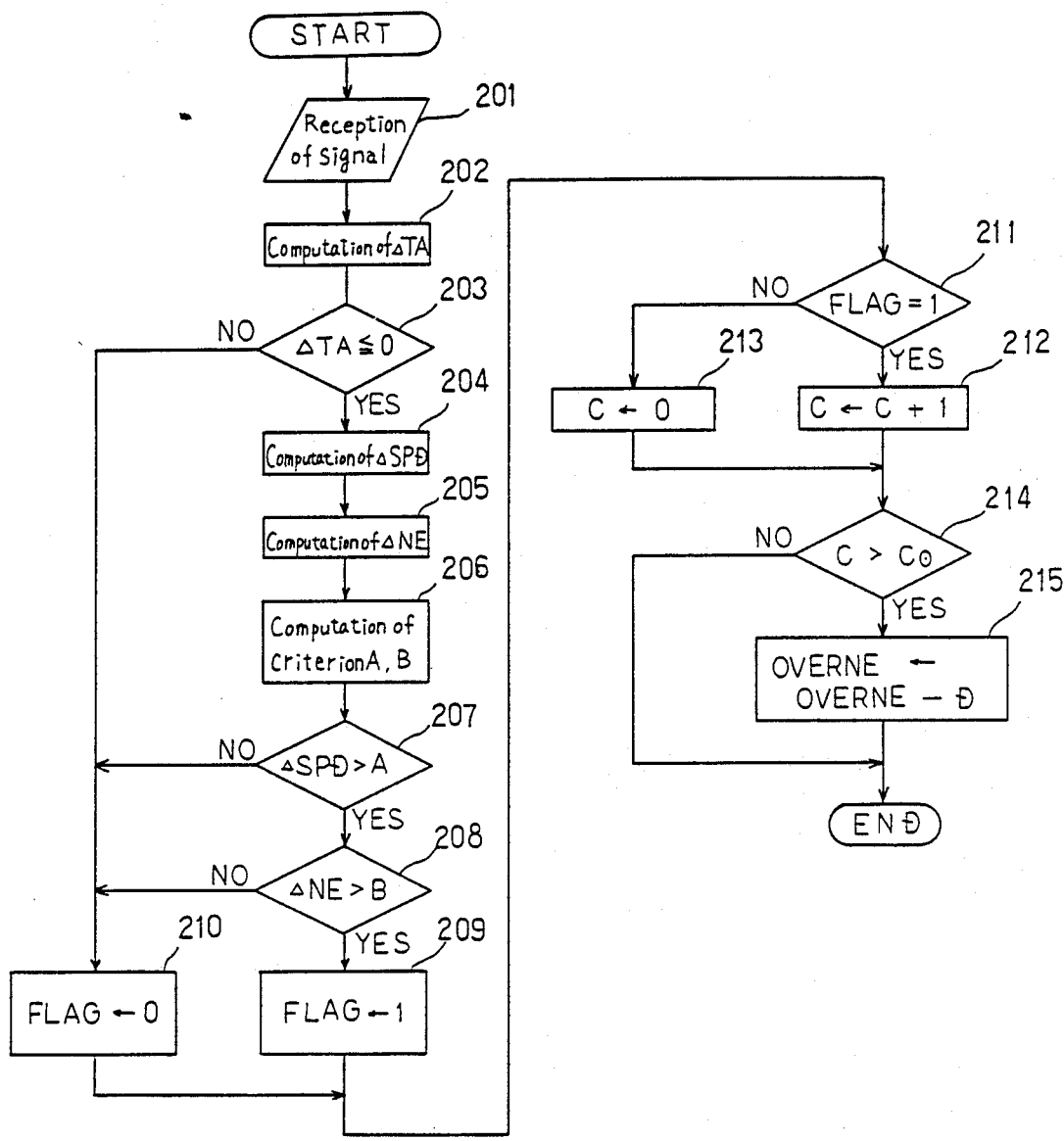
FIG. 2 is a flowchart showing the operation of ECU in FIG. 1.

ECU 15 executes the processing shown in FIG. 2 at every fixed period of time (for example every 100 ms). First, at step 201, signals are received from the above-mentioned sensors. These signals correspond to throttle opening TA, vehicle speed SPD, engine speed NE, the status of brake switch 141, and brake oil pressure BR. At step 202, a throttle opening variation $\Delta TA$ is determined on the basis of the throttle opening TA, that is, $\Delta TA$ is computed on the basis of difference ($\Delta TA = TA - TA'$) between $TA'$ computed previously and TA computed currently. At step 203, whether or not this throttle opening variation $\Delta TA$ is 0 or a negative value is judged. That is, at step 203, a judgement is made on whether or not the driver intends to accelerate. When $\Delta TA \leq 0$, that is, the throttle valve is kept stationary or moving toward closing because of the state that the driver does not intend to accelerate or speed up, the operation will proceed to step 204, and if not so, the operation will proceed to step 210.

At step 204, an operator induced change in the operation of the vehicle, such as a vehicle speed variation $\Delta SPD$, is computed on the basis of vehicle speed difference ($\Delta SPD = SPD - SPD'$) between SPD computed previously and SPD computed currently; and the previously detected value and at Step 205 an engine speed variation $\Delta NE$ on the basis of engine speed difference between NE computed previously and NE computed currently. At step 206, a criterion A for vehicle speed variation ΔSPD and a criterion B for engine speed variation ΔNE are calculated on the basis of the status of brake switch 141 and brake oil pressure BR. The relation between criteria A and B and the status of brake switch 141 and brake oil pressure BR are preset as shown in FIGS. 3 and 4, for example, and stored in a memory means of the ECU 15. As illustrated in FIGS. 3 and 4, the criterion A of the vehicle speed variation ΔSPD has been set to 5 km/h per second, while the criterion B of the engine speed variation ΔNE, to 500 rpm per second when brake switch 141 is OFF. When brake switch 141 is ON, the criteria values A and B decrease as brake oil pressure increases.

At step 207, a comparison is made between vehicle speed variation ΔSPD obtained at step 204 and criterion A obtained at step 206. When ΔSPD>A, the operation will proceed to step 208, and when ΔSPD≦A, the operation will proceed to step 210. At step 208, engine speed variation ΔNE obtained at step 205 and criterion B obtained at step 206 are compared. When ΔNE>B, the operation will proceed to step 209, and when ΔNE<B, the operation will proceed to step 210. When, as a result of the above-mentioned processing, the operation has proceeded to step 209, a flag which indicates intake system condition is set to 1 indicative of abnormal condition, and at step 210, the flag will be cleared to 0 indicative of normal condition.

Next, at step 211, whether or not the flag has been set to 1 is judged. When the flag has been set to 1, the counter C will be incremented at step 212. When the flag has been reset to 0 at step 213, counter C will be cleared to 0. At step 214, whether or not the value registered on the counter C exceeds a specific value $C_0$ (for example, 4) is judged. If the registered value exceeds the specific value because of continuance of the flag 1, the operation will proceed to step 215. Otherwise, the present processing will be ended. At step 215, subtraction is made by specific value D (for example, 5000 rpm) in order to decrease a maximum permissible engine speed above which fuel is automatically cut-off or reduced in the manner well known in the art to reduce engine output power, OVERNE (for example, 6500 rpm) and the subtracted value becomes the value of OVERNE. At the same time lamp 17 on a display panel near the driver is illuminated to indicate an intake system abnormality. At step 215 the processing in FIG. 2 will be finished.

According to the above-described processing, when the throttle valve 4 has not been opened or the driver does not intend to accelerate (YES at step 203), when the set values A and B of the vehicle speed variation ΔSPD and the engine speed variation ΔNE which are determined in accordance with brake switch 141 and brake oil pressure BR are exceeded (YES at steps 207 and 208), and when these conditions continue to exist for a specific period of time (YES at step 214), corrective action is taken (step 215). That is, when the above conditions are detected, it indicates that air is leaking into the intake air pipe downstream of throttle valve 4. At that time, the maximum permissible engine speed OVERNE is lowered, and accordingly the engine speed is controlled to less than the lowered maximum engine speed OVERNE in a well known manner so that the engine output power will not increase over the specific value.

Therefore, the abnormal operation of the engine can be fully and positively controlled by the aforementioned processing.

As processing at step 207 detects that a vehicle speed variation exceeds a specific value, if an operator changes operation of vehicle such as down-shifting or going to neutral with throttle held open, no error will occur in judgement.

In the above-described processing, criteria A and B are varied in accordance with the braking condition. Thus the criteria A and B are high when the brake pedal is not depressed and at a low brake oil pressure BR, and the criteria A and B are low at a high brake oil pressure BR. Therefore, it is possible to take into consideration the driver's demand for deceleration when determining how large the criteria should be. Also, when the engine speed and the vehicle speed rise on a steep downhill so that throttle valve 4 is not opening further, both criteria A and B will remain high if the brake pedal is not depressed or if the brake pedal is depressed with a low pressure. Therefore, even on a steep downhill road, no error will occur in judgement.

Furthermore, the flag denoting an abnormality must be set to 1 at step 209 and this must be repeated several times $C_0$ before any action is taken. An error in judgement that might be caused by temporary error detection of a signal, can be prevented.

The processing at steps 211 to 214 in the aforementioned processing may be omitted if criteria A and B are set to such values so that no abnormal engine operation will be indicated except when a failure has occurred on the downstream side of throttle valve 4.

Furthermore, criteria A and B may be set to fixed values whenever the brake is pressed (i.e., independent of brake oil pressure) which will discriminate normal engine operation from a failure downstream of the throttle. In fact, criteria A and B may have fixed values independent of both brake oil pressure and the status of brake switch 141.

In the aforementioned embodiment, whether the driver has any intention of accelerating is judged by throttle opening variation ΔTA which is calculated from throttle opening detected by throttle opening sensor 5. However, the fail-safe apparatus may instead include an idle switch which is in the ON position when throttle valve 5 is fully closed, such that when the replacement step illustrated in FIG. 5 determines the idle switch is ON, processing continues to step 204, and when the idle switch is OFF processing passes to step 210.

Since throttle valve 4 is coupled to accelerator pedal 16 which the driver operates, an accelerator pedal position sensor and an accelerator full-close switch may be used in place of the throttle opening sensor and the idle switch in order to detect that the throttle valve is not moved toward opening for acceleration.

In the aforementioned embodiment, engine power is decreased by lowering the fuel cut engine speed when an intake system malfunction has been detected. However, the engine power may be decreased by other means, for example by thinning out fuel injection, thinning out ignition, lowering the air-to-fuel ratio, and retarding the ignition timing. Furthermore, there may be provided an auxiliary throttle valve which usually opens wide downstream of the throttle valve 4 and slightly upstream of the engine 1, and in the event of trouble, the auxiliary throttle valve may be closed to an opening that allows idling. In the case of an engine equipped with a supercharger, the engine power may be decreased by stopping the supercharger to lower a supercharge pressure and also by combining the aforementioned means.

The fail-safe method and apparatus of the present invention which controls the engine by intake air pressure and engine speed can very easily judge the state of a failure, if any, of the intake system downstream of the throttle valve and quickly function to decrease the engine power, thereby fully preventing the excessive rise of the engine speed as described above.

Although only a single preferred embodiment has been described in detail above, those skilled in the art will readily appreciate that many modifications can be made to the preferred embodiment without departing from the novel teachings and advantages of this invention.

For example, instead of detecting variations in vehicle speed, other operator induced changes can be detected instead, such as detecting down-shifting and the vehicle being placed sudden in neutral so that engine speed increases even though the throttle valve is not further opened. Such a substitution would produce the same result in accordance with this invention. Accordingly all such modifications are intended to be included within the scope of this invention as defined by the following claims.

What is claimed is:

1. Apparatus for preventing uncontrolled acceleration in an engine for a motor vehicle, said engine having an intake system with a throttle valve, said engine being controlled on the basis of intake air pressure and engine speed, said apparatus comprising:
    first means for detecting a position of said throttle valve and non-opening of said throttle valve on the basis of said position;
    second means for detecting a speed of said engine and determining when a value related to engine speed exceeds a predetermined criterion based upon said speed;
    judging means, coupled to said first and second means, for judging abnormal operation of said intake system when said first means detects that said throttle valve is not opening and said second means detects that said value related to engine speed exceeds said predetermined criterion; and
    power decreasing means for decreasing engine power on the basis of a result of a judgement by said judging means.

2. Apparatus as in claim 1, wherein said judging means also generates said value in accordance with variations in engine speed detected by said second means and performs said judging based on said variations.

3. Apparatus as in claim 2, wherein said second means detects said engine speed variation over a specific period of time and said judging means judges abnormal operation when said variation over a specific period of time exceeds said predetermined criterion.

4. Apparatus as in claim 1, wherein said first means detects said non-opening when a variation in said throttle valve position is zero or negative.

5. Apparatus as in claim 1, wherein said first means includes a switch which detects that said throttle valve is in a fully-closed position.

6. Apparatus as in claim 1 further comprising warning means for warning a driver of abnormal operation of said intake system when said judging means has judged the occurrence of the abnormality.

7. Apparatus as in claim 1, wherein said judging means also changes said predetermined criterion on the basis of an on-off operation of a brake switch.

8. Apparatus as in claim 1, wherein said judging means changes said predetermined criterion in accordance with brake oil pressure.

9. Apparatus as in claim 1, wherein said power decreasing means decreases an engine speed above which fuel is automatically reduced.

10. Apparatus for preventing uncontrolled acceleration in an engine for a motor vehicle, said engine having an intake system with a throttle valve, said engine being controlled on the basis of intake air pressure and engine speed, said apparatus comprising:
    first means for detecting a position of said throttle valve;
    second means for detecting a speed of said engine;
    third means for detecting a parameter of said vehicle other than said throttle valve position and said engine speed;
    judging means, coupled to said first, second and third means, for discerning, in response to said throttle valve position, whether said throttle valve is not opening, discerning in response to said engine speed whether a valve associated with engine speed exceeds a predetermined criterion, discerning in response to said parameter whether a change in said parameter exceeds a second predetermined criterion and judging abnormal operation of said intake system when it is determined that said throttle valve is not opening, said value related to engine speed exceeds said predetermined criterion and said change in said parameter exceeds said second predetermined criterion; and
    power decreasing means for decreasing engine power on the basis of a result of a judgement by said judging means.

11. A fail-safe apparatus as in claim 10, wherein said third means includes means for detecting a speed of said motor vehicle.

12. A fail-safe apparatus as in claim 10, wherein said judging means determines variations in vehicle speed per specific period of time and judges abnormal operation when said variations per specific period of time exceed said second predetermined criterion.

13. Apparatus as in claim 12, wherein said judging means changes said second criterion on the basis of an ON-OFF operation of a brake switch.

14. Apparatus as in claim 12, wherein said judging means changes said second criterion in accordance with brake oil pressure.

15. Apparatus as in claim 10, wherein said power decreasing means decreases an engine speed above which fuel is automatically reduced.

16. A method for preventing uncontrolled acceleration in an engine for a motor vehicle, said engine having an intake system with a throttle valve which is controlled on the basis of intake air pressure and engine speed, said fail-safe method including the steps of:
    detecting a position of said throttle valve;
    detecting a speed of said engine;
    generating an abnormality signal indicating that said intake system is operating abnormally when said throttle valve is not opening and a value related to engine speed exceeds a predetermined criterion; and
    automatically decreasing engine power when said abnormality signal is generated.

17. A method as in claim 16, wherein said decreasing step includes the step of decreasing an engine speed above which fuel is automatically reduced.

18. A method as in claim 16 further comprising the step of determining variations in engine speed over a predetermined time as said value related to engine speed, said generating step generating said abnormality signal when said variations exceed said predetermined criterion.

19. A method as in claim 18 further comprising the step of determining variations in vehicle speed over a predetermined time, said generating step generating said abnormality signal when said vehicle speed variations exceed another predetermined criterion.

20. A method as in claim 16 further comprising the step of detecting a speed of said vehicle, said generating step generating said abnormality signal when a value related to vehicle speed exceeds another predetermined criterion.

21. A method as in claim 20 further comprising the step of changing said another predetermined criterion in response to an ON-OFF state of a brake switch.

22. A method as in claim 20 further comprising the step of changing said another predetermined criterion in response to brake oil pressure.

23. A method as in claim 16 further comprising the step of changing said predetermined criterion in response to an ON-OFF state of a brake switch.

24. A method as in claim 16 further comprising the step of changing said predetermined criterion in response to brake oil pressure.

* * * * *